United States Patent [19]

Jones et al.

[11] 3,953,544

[45] Apr. 27, 1976

[54] LOW TEMPERATURE CURING ADHESIVES

[75] Inventors: Robert J. Jones, Hermosa Beach; Howard E. Green, Los Angeles; Robert W. Vaughan, Manhattan Beach, all of Calif.

[73] Assignee: TRW Inc., Redondo Beach, Calif.

[22] Filed: May 10, 1974

[21] Appl. No.: 468,705

[52] U.S. Cl............................ 526/304; 526/227; 526/312; 526/328; 260/37 N; 260/37 M; 260/468 L; 260/486 R; 260/486 H
[51] Int. Cl.$^2$............... C08F 120/02; C08F 226/00; C07C 69/00; C07C 69/52
[58] Field of Search.............. 260/89.7 N, 89.5 N, 260/89.5 A, 57 N, 37 M, 89.7 N, 37 N, 80.73, 86.1 N

[56] References Cited

FOREIGN PATENTS OR APPLICATIONS 947,610   7/1964   United Kingdom................. 450/742

*Primary Examiner*—Joseph L. Schofer
*Assistant Examiner*—Herbert J. Lilling
*Attorney, Agent, or Firm*—Daniel T. Anderson; Alan D. Akers; Willie Krawitz

[57] ABSTRACT

A low temperature curing polymeric adhesive composition may be made by reacting an amino alcohol having between 1 and 3 amino groups and between 2 and 5 hydroxyl groups with a stoichiometric amount of a carboxylic acid or derivative. Free radical catalysts and accelerators may be added to speed the cure of the adhesive. These adhesive resins can be cured at or near ambient room temperature and are highly desired for fabrication of bonded materials possessing long fatigue life because of reduced stresses that might be induced at higher cure temperatures. A generalized formula may be illustrated as follows:

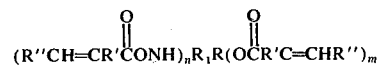

where R'' may be hydrogen, alkyl, or cycloalkyl; R' may be hydrogen or alkyl; R is an alkyl; $R_1$ may be hydrogen, an alkyl, or phenyl; $m$ is an integer from 1 to 3; and $n$ is an integer from 1 to 2.

6 Claims, No Drawings

LOW TEMPERATURE CURING ADHESIVES

BACKGROUND OF THE INVENTION

Compatability with substrates and suitability for the intended use environment are important considerations in the choice of an adhesive for many applications, particularly for advanced or high performance uses.

For example, if a structure comprising an aluminum alloy bonded to a sheet of graphite fiber composite is fabricated for use at room or ambient temperatures, cure or post cure of a thermosetting resin adhesive at elevated temperatures, e.g. greater than 50°C, will produce a final product which is warped as a result of differential thermal expansion between the aluminum alloy and the graphite fiber composite when the structure is cooled.

There are, of course, numerous examples of materials with inadequate thermal, chemical, and/or physical properties for specific uses. For example, sensitivity to moisture, particularly at elevated temperatures, is a recently noted deficiency of epoxy adhesives. Hydrolytic instability has also been encountered in silicone adhesives. Some thermosets are too rigid for use in areas of high torsion or flex, whereas some linear, thermally stable resins, such as polyquinoxalines, show unwanted thermal plasticity within their intended use range.

If a bonded joint does not fail cohesively, in the adhesive or adherend, the break generally occurs in an area called the "weak boundry layer", rather than at the adhesiveadherend interface. The weak boundry layer is a region near the interface where unrelieved stresses develop during the formation of the joint. These stress concentrations are generally the weakest link in the bond and serve to reduce its ultimate strength. Some of the principle causes for the development of stress concentrations are formation of bubbles, voids or inclusions because of high initial viscosity, loss of solvent, poor wetting of the surface areas by the adhesive, differential thermal expansion of adhesive and adherend, differential thermal expansion of dissimilar adherends, volume changes due to phase change polymerization during the cooling of a melt, and impurities or deleterious coatings which adversely alter surface characteristics.

The extent and strength deficiencies of the weak boundry layer may be alleviated, or in some cases eliminated, by changes of adhesive formulation, application and cure techniques, and adherend surface characteristics. For example, excessive viscosity may be reduced by the addition of plasticizer or solvent. Wetting may be improved by the addition of a surfactant to reduce the surface tension of the adhesive. Conversely, the surface energy of the adherend may be increased by chemical or radiation modification of the surface. Elastic stresses which may develop at points of contact between voids during cure under temperature and pressure may be reduced by annealing the joint under load.

Although the techniques for alleviating specific causes of stress concentrations are effective in many cases they often compromise other desirable properties. Plasticizers tend to reduce the cohesive strength of the polymeric materials, and the use of solvents for viscosity reduction may result in formation of bubbles during evaporation. Surfactants may reduce cohesive strength by also acting as plasticizers. Vigorous adherend surface treatments may result in local weak points or the creation of a new form of weak boundry layer extending into the body of the solid.

A more basic approach to the elimination of stress concentrations and weak boundry layers is the modification or tailoring of the molecular structure of the adhesive resin itself to correct deficiencies in wetting, viscosity, strength, and differential thermal expansion.

SUMMARY OF THE INVENTION

In the past, where a high temperature curing adhesive was used to bond two dissimilar adherends, residual stresses which occurred upon cooling to normal or room temperatures tended either to weaken the bond or to distort the adherends. In order to overcome these undesirable results, a high performance adhesive has been formulated which can be cured at the lower service temperature, thus avoiding adherend distortion or bond weakening as a result of thermal expansion mismatch. It is to this end that a family of versatile, high performance resins amenable to low temperature curing methods, whose physical and chemical behavior can be adjusted by relatively simple changes of chemical structure, has been formulated. In addition, the low temperature cure range, 30° to 100°F. permits field repair of bonded structures by eliminating the need for ovens to affect cure.

The new adhesive comprises a group of multifunctional, unsaturated ester and amide structures having the general structure

where $R''$ may be selected from any of $-H, -C_xH_{2x+1}$, or

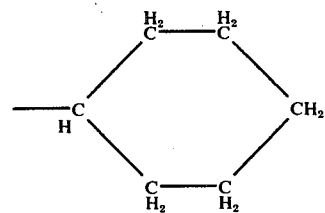

where $x$ is an integer from 1 to 6; $R'$ is selected from hydrogen or—$C_yH_{2y}$— where y is an integer from 1 to 3; $R_1$ may be hydrogen radical, a substituent alkyl group having 1 to 3 carbon atoms, or a phenyl group; R is a substituted alkane having 3 to 5 carbon atoms; $m$ is an integer from 1 to 3, and $n$ is an integer from 1 to 2, and $m + n$ is from 3 to 5.

This monomer structure incorporates double bond unsaturation of the type which may be cured at conveniently low temperatures by conventional free radical agents. The rate and degree is subject to precise manipulation by careful selection of the curing agent. Other physical, chemical, and mechanical properties, as well as thermal-oxidative and hydrolytic stability of the resins, may be changed by varying the ratio of $m$ to $n$, and the number and type of side chains and functional groups represented by the R's in the general structure.

DESCRIPTION OF THE PREFERRED EMBODIMENTS

Adhesive monomers of the present invention are made by reacting a stoichiometric amount of a carboxylic acid or derivative with an amino alcohol. Cure of the liquid resin adhesive may be accomplished at ambient room temperature, in the range of 30° to 100°F, with the assistance of a free radical initiator and an accelerator. When necessary, additional strength may be obtained by the inclusion of powdered or fibrous fillers. These neat, cured resin adhesives have shown good thermal-oxidative stability and low temperature flexibility while giving lap shear strengths ranging from 700 to 1260 psi.

Carboxylic acids used in the resin formulation are selected from aliphatic compounds having an olefinic unsaturation in the molecule. This unsaturated structure readily lends itself to cross-linking in the presence of a free radical catalyst, thereby producing a tenacious carbon-carbon bond. The olefinic carboxylic compounds which may be used may be illustrated by the following general formula:

$$R''CH=CR'A$$

where $R''$ may be a hydrogen radical, a cycloalkyl radical, or an alkyl radical having 1 to 6 carbon atoms; $R'$ may be selected from a hydrogen radical or an alkylene radical having 1 to 3 carbon atoms; and A is selected from an anhydride radical or a carboxylic acid radical having the general formula:

$$-COX$$

where X may be selected from —Cl, —Br, —I, —OH, —OCH$_3$, —OCH$_2$CH$_3$, —OC$_3$H$_7$, and —OC$_4$H$_9$. When $R'$ is a hydrogen radical, the carboxylic acid or derivative thereof is attached directly to the olefinic structure. A few of the carboxylic acids or their derivatives are identified by name in the following:

TABLE I

Carboxylic Acids (or their derivatives)
  acrylic
  2-methyl acrylic
  3-methyl acrylic
  vinylacetic
  3,3-dimethylacrylic
  2,3-dimethylacrylic
  3-cyclohexylacrylic Amino alcohols used herein should be at least trifunctional so that a three-dimensional resin matrix is formed upon cure. Although there is no upper limit on the functionality of the amino alcohols, practical considerations indicate an upper functionality of 5 is reasonable. This functionality is provided by one or two substituent amino groups and the remainder hydroxyl groups. A general formula for the amino alcohols may be illustrated as follows:

$$R_1R(OH)_m(NH_2)_n$$

where $R_1$ may be any of —H, —C$_z$H$_{2z+1}$, and

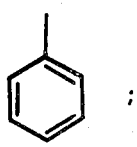

where $z$ is an integer from 1 to 3; R is a substituted alkane having 3 to 5 carbon atoms; $n$ is an integer from 1 to 2; and $m$ is an integer from 1 to 3, where $n + m$ is from 3 to 5. The substituent groups on R comprise $R_1$ and the hydroxyl and amino radicals. The following table lists a few, but not all of the representative amino alcohols by name:

TABLE II

Amino Alcohols
  3-amino-1,2-propanediol
  tris-(hydroxymethyl) aminomethane
  2-amino-2-ethyl-1,3-propanediol
  2-amino-1,3-propanediol
  1-phenyl-2-amino-1,3-propanediol
  2-amino-1,3-butanediol The reaction between the amino alcohol and the carboxylic acid or derivatives to produce the resin adhesive takes place at reduced temperatures in the range of −20°C to 100°C. After the cooled mixture of reactants has been mixed for several minutes, a precipitate begins to form. Stirring of the mixture is continued for an additional two to four hours to assure that the reaction has gone to completion. In order to assure the completion of the reaction, the mixture may be refluxed for ½ to 1 hour before filtering the precipitate from the filtrate. The ester-amide filtrate can be concentrated by an evaporator to the desired viscosity. The reaction may be illustrated as follows:

$$R_1R(OH)_m(NH_2)_n + R''CH=CR'A$$
$$\downarrow$$
$$(R''CH=CR'CONH)_nR_1R(OCR'C=CHR'')_m$$

in which A becomes the radical —COO—.

After the ester-amide has been prepared, a small amount of a free-radical catalyt and an organic accelerator can be mixed into the liquid monomer. Shortly after mixing the catalyst and accelerator into the resin, a gradual increase in viscosity may be noted, becoming immobile after a few hours and completely cured within 48-hours or less.

Generally, any free-radical catalyst which is known to cause the reaction of olefinic sites, will be suitable. One large class of free-radical catalysts are the organic peroxides. The following table lists a few, but not all, of the suitable oganic peroxides:

TABLE III

Free-Radical Catalysts
  (1) di-t-butyl peroxide
  (2) 2,5-dimethyl-2,5-bis(tertiary butylperoxy) hexane
  (3) n-butyl-4,4-bis(tertiary butylperoxy) valerate
  (4) 2,5-dimethyl-2,5-bis(tertiary butylperoxy) hexyne-3
  (5) tertiary-butyl perbenzoate
  (6) dicumyl peroxide
  (7) methyl ethyl ketone peroxide
  (8) cumene hydroperoxide
  (9) di-N-methyl-t-butyl percarbamate
  (10) lauroyl peroxide
  (11) acetyl peroxide
  (12) decanoyl peroxide

TABLE III-continued

(13) t-butyl peracetate
(14) t-butyl peroxyisobutyrate

Generally, catalyst in the amount of between 0% and 15% by weight of the total composition will be sufficient to catalyze the resin cross-linking cure.

The accelerator-dryer may be any of the well-known compounds used for this function. Examples of a few of the organo-metallic compounds are cobalt naphthenate and manganese naphthenate, while organic compounds such as dimethyl aniline or dodecyl mercaptan are also suitable. These accelerators may be added to the resin formulation in the range of 0 to 15% by weight of the resin composition to reduce the set and cure time of the adhesive.

Various fillers in amounts up to 90% by weight of the adhesive composition may be added to the resin. While it is common practice to add inner reinforcing fillers to prior art adhesive compositions, such practice is not as critical to the enhancement of beneficial properties in the present resin composition because of the reduced stresses resulting from ambient temperature cures. However, benefits in varying degrees can be achieved by the addition of reinforcing fillers, for example, increased viscosity, reduced resin content per unit volume, etc. In addition, if large thermal expansions are contemplated, powdered metal fillers can be incorporated to coincide the expansion more closely with the expansion of the adherends.

The inert reinforcing fillers may be selected from a wide variety of materials, for example, fibers and filaments of carbon, boron, iron, and other metals are suitable. Reinforcing fillers may be selected also from powders of metals, such as aluminum, iron, copper, etc., or from silicates, such as asbestos, or from oxides, such as silicon dioxide, titanium dioxide, alumina, etc. In addition to the reinforcing fillers, other state of the art techniques may be used to enhance the adhesive properties of these resin compositions. For example, coupling agents, such as organosilanes, could be mixed into the resin composition and applied to carriers, such as scrim cloth.

In order that the present invention may be better understood, the following examples are set forth to illustrate the various features of the present invention.

EXAMPLE I

Into a three necked round bottomed flask equipped with a mechanical stirrer and nitrogen source was added 23.8 g (0.2 mol) of 2-amino-2-ethyl-1,3-propanediol, 400 ml of ethyl ether, 63 g (0.6 mol) of triethylamine and 100 mg of phenothiazine. The mixture was cooled by immersing the flask in an ice-water bath. Vigorous stirring was begun and 54 g (0.6 mol) of acryloyl chloride was added over a 45-minute period. A precipitate formed shortly after acid chloride addition was begun. The reaction mixture was stirred for an additional two hours with ice-water cooling and then at reflux for 30-minutes. The precipitate was removed by filtration and the filtrate was concentrated with the aid of a rotary evaporator. The diester-amide was obtained as a yellow-green viscous liquid and had the structure:

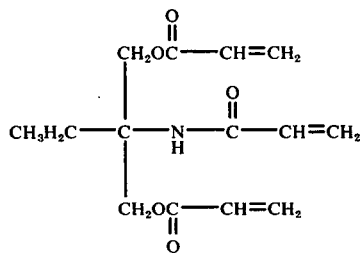

EXAMPLE II

A monomer was prepared employing the same apparatus, procedures, and conditions as Example I using as reactants: 24.4 g (0.2 mol) of tris-(hydroxymthyl)aminoethane; 84.2 g (0.8 mol) of triethylamine; 100 mg of phenothiazine; and 83.6 g 83.6 g (0.8 mol) of crotonyl chloride. The monomer is illustrated by the structure.

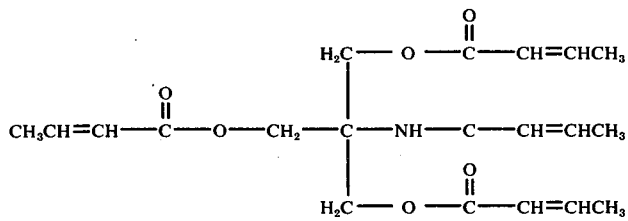

EXAMPLE III

A monomer was prepared employing the same apparatus, procedures, and conditions as for Example I using as reactants: 18.2 g (0.2 mol) of 3-amino-1,2-propanediol, 63 g (0.6 mol) of triethylamine; 100 mg phenothiazine; 62.7 g (0.6 mol) of methacryloylchloride. The monomer is illustrated by the following structure:

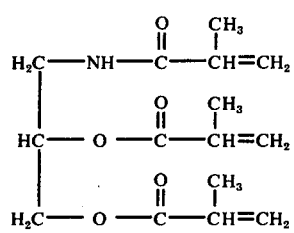

EXAMPLE IV

In a small aluminum dish was placed 1 g of the diesteramide prepared in Example I and three drops each of methyl ethyl ketone peroxide and 6% cobalt naphthenate dryer. The resin was allowed to stand at ambient room temperature and a gradual increase in viscosity was noted. After four hours the material had become immobile and only slightly tacky. After 24-hours the material had become hard and demonstrated strong adherence to the aluminum.

EXAMPLE V

A cold solution (about 0°C) of 27.2 g (0.3 mol) of acryloyl chloride in 60 ml of dry tetrahydrofuran was poured all at once into a one-liter blender jar containing a vigorously agitated, cold (about 0°C) solution of 9.1 g (0.1 mol) of 3-amino-1,2-propanediol and 12.0 g (0.3 mol) of sodium hydroxide in 100 ml of water. During the reaction the blender jar was cooled with an ice-water jacket to maintain a reaction temperature of no greater than 20°C. Mixing was continued for ten minutes, then the solution was extracted twice with 300 ml portions of chloroform. The combined chloroform solutions were washed twice with saturated sodium bicarbonate solution and then dried over magnesium sulfate. 2,6-ditertiarybutyl-4-methylphenol antioxidant (0.08g) was added to the solution and then the chloroform was removed at room temperature under reduced pressure. The compound is illustrated by the structure:

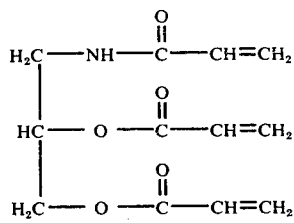

EXAMPLE VI

A monomer was prepared employing the same apparatus, procedures, and conditions as for Example V using as reactants: 12.1 g (0.1 mol) of tris-(hydroxymethyl)aminomethane; 36.6 g (0.4 mol) of acryloyl chloride; 16.0 g (0.4 mol) of sodium hydroxide; 0.08 g of 2,6-ditertiarybutyl-4-methylphenol. The monomer is illustrated as follows:

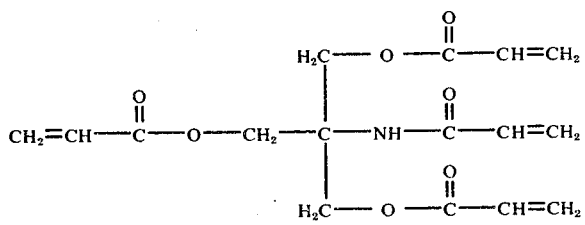

Five test specimens were prepared by spreading the monomer prepared according to the Examples above and which had been mixed with 5% by weight methyl ethyl ketone peroxide and cobalt naphthenate, onto the surface of clean, matching strips of a 6% aluminum-4% vanadium-90% titanium alloy and strips of aluminum. Each strip measured 0.15m × 0.013m × 0.0013m. The coated surfaces were placed together and the monomer was allowed to cure for 24-hours at room temperature under 1.6 lb/in² pressure. Each of the bi-metallic strips was heated in an air oven at 71°C for 16-hours. After the test specimens had cooled to ambient room temperature, they were examined for residual curvature, adhesion, and mode of bond rupture when separated.

Measurement of the curvature of the bi-metallic specimens showed them to be free of residual curvature, indicating that no further cure occurred in the hot air oven. Separation of the strips resulted in bond failure that was principally, i.e. greater than 90%, cohesive in nature. Where evidence of adhesive failure was noted, it was found at the aluminum surface. There was no evidence of deleterious adhesive-metal interactions.

Moisture sensitivity tests of the resins were conducted using bonded pairs of aluminum strips which were immersed in boiling water for 2 hours. the aluminum strips were cleaned and bonded with the monomers from Examples I, V, and VI using the procedure described above. After the cure was complete, the bonded test strips were dried in a circulating-air oven for two hours at 100°C. The dried strips were weighed, immersed in boiling water for two hours, dried, and then weighed again.

The results of the moisture sensitivity tests for the three resins which were cured with 5% by weight methyl ethyl ketone peroxide and cobalt naphthenate are shown in Table IV below. In all instance, the adhesive bonds remained intact and less than 0.1% of the resin weight was re removed by the boiling water.

TABLE IV

| Example | Moisture Sensitivity Tests Weight Loss (%)[a] |
|---|---|
| I | 0.0741 |
| V | 0.0640 |
| VI | 0.156 |

[a] After two hours immersion in boiling water; duplicate runs.

Three pairs of lap-shear coupons were cleaned in the manner described above and then primed with a thin-coating of neat-resin taken from Examples I, V, and VI and containing 5% by weight methyl ethyl ketone peroxide and cobalt naphthenate. A 0.025m × 0.51m piece of glass cloth was placed immediately on the prime surface of the aluminum coupon and then impregnated with the resin. The lap-shear coupon was then assembled and pressures of 5 psi and 10 psi were applied during the 24-hour cure. The results of the lap-shear strength test are shown in Table V.

TABLE V

| Resin System Examples + | Lap-Shear Strength Tests Strength N/m²* (psi) |
|---|---|
| I | 7.6 × 10⁶ (1100) |
| V | 8.7 × 10⁶ (1260) |
| VI | 4.8 × 10⁶ (700) |

*N/m² - Newtons/square meter

We claim:
1. An adhesive consisting essentially of a solid polymeric material produced by curing at ambient temperatures:
   A. from 10% to 100% by weight of a monomer or monomers having the structure:

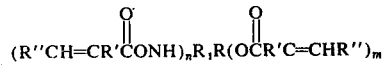

wherein R'' is selected from the group consisting of

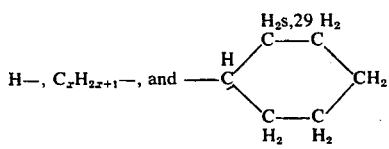

where $x$ is an integer from 1 to 6; R' is selected from the group consisting of hydrogen and $-C_YH_{2Y}-$, where $Y$ is an integer from 1 to 3; R is selected from the group consisting of alkane radical having 3 to 5 carbon atoms; $R_1$ is selected from the group consisting of $-H$, $-C_zH_{2z+1}$, and

where $z$ is an integer from 1 to 3; $m$ is an integer from 1 to 3; $n$ is an integer from 1 to 2; and $n + m$ is from 3 to 5;
   B. from 0% to 5% by weight of a free radical peroxide catalyst; and
   C. from 0% to 15% by weight of an organic accelerator.

2. An adhesive according to claim 1 wherein the monomer formula is:

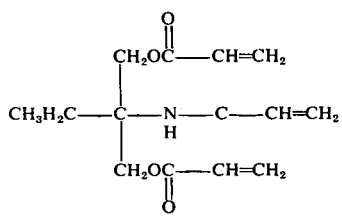

3. An adhesive according to claim 1 wherein the monomer formula is:

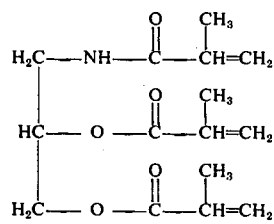

4. An adhesive according to claim 1 wherein the monomer formula is:

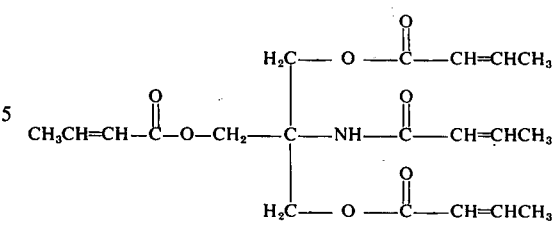

5. An adhesive according to claim 1 wherein: an inert reinforcing filler is added to the monomer.

6. An adhesive according to claim 1 wherein: the ambient temperature ranges from 30° to 100°F.

* * * * *